United States Patent
Kim

(10) Patent No.: US 10,428,722 B2
(45) Date of Patent: Oct. 1, 2019

(54) TEMPERATURE MANAGEMENT METHOD FOR HYBRID VEHICLE

(71) Applicants: HYUNDAI MOTOR COMPANY, Seoul (KR); KIA MOTORS CORPORATION, Seoul (KR)

(72) Inventor: Seung Bum Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 37 days.

(21) Appl. No.: 15/825,922

(22) Filed: Nov. 29, 2017

(65) Prior Publication Data

US 2018/0334947 A1    Nov. 22, 2018

(30) Foreign Application Priority Data

May 18, 2017    (KR) .......................... 10-2017-0061412

(51) Int. Cl.
*F01P 7/16*    (2006.01)
*B60W 20/00*    (2016.01)
(Continued)

(52) U.S. Cl.
CPC ............... *F01P 7/16* (2013.01); *B60W 20/00* (2013.01); *F01N 3/10* (2013.01); *F01N 3/2066* (2013.01); *F01N 5/02* (2013.01); *F01P 3/20* (2013.01); *F02D 41/068* (2013.01); *F01N 2240/02* (2013.01); *F01N 2590/11* (2013.01); (Continued)

(58) Field of Classification Search
CPC .. F01P 7/16; F01P 3/20; F01P 2060/16; F01P 2007/146; F01N 5/02; F01N 3/2066; F01N 3/10; F01N 2590/11; F01N 2240/02; B60W 20/00; F02D 41/068; Y10S 903/00

See application file for complete search history.

(56) References Cited

U.S. PATENT DOCUMENTS 8,333,068 B2 *   12/2012   Muramatsu ........... F01N 3/0205
                                              60/320
8,567,182 B2 *   10/2013   Prior ..................... B60H 1/025
                                              60/274

(Continued)

FOREIGN PATENT DOCUMENTS

JP    2008-231942 A    10/2008
JP    2011-080450 A     4/2011
(Continued)

*Primary Examiner* — Joseph J Dallo
(74) *Attorney, Agent, or Firm* — Morgan, Lewis & Bockius LLP

(57) ABSTRACT

A temperature management method for a hybrid vehicle which includes: a flow rate control valve controlling flow of coolant to an engine, a heater, a heat exchanger, and a radiator; and an exhaust heat recovery device coupled to the flow rate control valve via the heater, the exhaust heat recovery device performing heat exchange between the coolant received from the heater and exhaust gas received from the engine, and supplying the heat-exchanged coolant to the engine, includes: identifying whether the heater is on or off; and identifying at least one of an outside air temperature, a coolant temperature, or an oil temperature and operating the flow rate control valve in a flow stop mode to prevent the coolant of the engine from discharging.

9 Claims, 2 Drawing Sheets

(51) Int. Cl.
*F01P 3/20* (2006.01)
*F02D 41/06* (2006.01)
*F01N 3/10* (2006.01)
*F01N 3/20* (2006.01)
*F01N 5/02* (2006.01)
*F01P 7/14* (2006.01)

(52) U.S. Cl.
CPC ..... *F01P 2007/146* (2013.01); *F01P 2060/16* (2013.01); *Y10S 903/00* (2013.01)

(56) References Cited

U.S. PATENT DOCUMENTS

| | | | | |
|---|---|---|---|---|
| 2007/0272480 | A1* | 11/2007 | Kuroda | B01D 53/9454 181/254 |
| 2008/0028768 | A1* | 2/2008 | Goenka | B60H 1/004 62/3.2 |
| 2010/0155018 | A1* | 6/2010 | Goenka | B60H 1/00278 165/59 |
| 2011/0088378 | A1* | 4/2011 | Prior | F01M 5/001 60/320 |
| 2011/0099989 | A1* | 5/2011 | Prior | F01N 3/043 60/320 |
| 2011/0126782 | A1 | 6/2011 | Saele | |
| 2011/0131961 | A1* | 6/2011 | Lee | F01M 5/001 60/320 |
| 2011/0239634 | A1* | 10/2011 | Reynolds | F01N 5/02 60/320 |
| 2012/0160447 | A1* | 6/2012 | Kinomura | B60H 1/025 165/51 |
| 2012/0222838 | A1* | 9/2012 | Hisanaga | F01N 13/082 165/96 |
| 2013/0213322 | A1* | 8/2013 | Takeuchi | F01P 3/02 123/41.1 |
| 2013/0240284 | A1* | 9/2013 | Ajisaka | F01N 3/2006 180/309 |
| 2015/0240701 | A1* | 8/2015 | Amano | B60H 1/00314 123/41.02 |
| 2015/0275741 | A1* | 10/2015 | Amano | B60W 20/00 60/320 |
| 2016/0186625 | A1* | 6/2016 | Oya | F01N 3/043 60/320 |
| 2016/0195002 | A1 | 7/2016 | Ito et al. | |
| 2016/0341100 | A1 | 11/2016 | Nagai et al. | |
| 2016/0369685 | A1* | 12/2016 | Cho | F01P 7/164 |
| 2018/0156143 | A1* | 6/2018 | Hussain | F02D 41/26 |

FOREIGN PATENT DOCUMENTS

| | | | |
|---|---|---|---|
| JP | 2013079580 A | * | 5/2013 |
| JP | 2015-052308 A | | 3/2015 |
| KR | 10-1637680 B1 | | 7/2016 |

* cited by examiner

TEMPERATURE MANAGEMENT METHOD FOR HYBRID VEHICLE

CROSS REFERENCE TO RELATED APPLICATION

The present application claims priority to Korean Patent Application No. 10-2017-0061412, filed May 18, 2017, the entire content of which is incorporated herein for all purposes by this reference.

TECHNICAL FIELD

The present disclosure relates generally to a temperature management method for a hybrid vehicle. More particularly, the present disclosure relates to a temperature management method for a hybrid vehicle, the method being capable of rapidly warming up an engine by properly controlling a flow rate control valve and an exhaust heat recovery device.

BACKGROUND

Due to worldwide $CO_2$ restrictions and fuel efficiency regulations, improvement in fuel efficiency and the development of eco-friendly vehicles have been key items in automotive industry. Thus, leading vehicle manufacturers have invested heavily in developing technologies to achieve these objectives.

In a cold condition, at the beginning of starting a vehicle, an engine has low fuel efficiency in comparison with a sufficiently warmed-up engine. In a cold condition, the viscosity of oil becomes higher due to low temperature of the oil, and friction in the engine is large due to the high viscosity of the oil. Due to the low temperature of cylinder walls, heat loss through the walls is huge and the stability of combustion is deficient, and thus fuel efficiency is decreased.

Therefore, it is required to rapidly increase the temperature of the engine to a normal temperature at the beginning of starting the vehicle engine so as to enhance fuel efficiency and engine durability thereof.

In addition, recently, a hybrid vehicle has EV mode where the engine is turned off, and such a mode requires that a technology of rapidly warming up the engine when the engine is turned on during running the hybrid vehicle in EV mode.

Thus, recently, a technology of warming up coolant of the engine by using an exhaust gas temperature has been proposed.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a temperature management method for a hybrid vehicle that can rapidly warm up an engine by properly controlling a flow rate control valve and an exhaust heat recovery device when the engine is in a cold condition.

In order to achieve the above object, according to one aspect of the present disclosure, there is provided a temperature management method for a hybrid vehicle having: a flow rate control valve controlling flow of coolant to an engine, a heater, a heat exchanger, and a radiator; and an exhaust heat recovery device coupled to the flow rate control valve via the heater, the exhaust heat recovery device performing heat exchange between the coolant received from the heater and exhaust gas received from the engine, and supplying the heat-exchanged coolant to the engine, the method including: identifying, by a controller at a heater identification step, whether the heater is on or off; and identifying, by the controller at a control step, at least one of an outside air temperature, a coolant temperature, or an oil temperature depending on a result of the heater identification step, and operating the flow rate control valve in a flow stop mode to prevent the coolant of the engine from discharging, or operating the exhaust heat recovery device based on data of identified temperature.

The control step may include: comparing, by the controller at a first comparison step, the outside air temperature with a first preset value when the heater is on as the result of the heater identification step; and operating, based on a result of the first comparison step by the controller at a first control step, the flow rate control valve in the flow stop mode, or operating the exhaust heat recovery device.

When the outside air temperature exceeds the first preset value as the result of the first comparison step, the controller may operate the flow rate control valve in the flow stop mode at the first control step, and when the coolant temperature exceeds a second preset value, the controller may operate the exhaust heat recovery device while stopping the operating of the flow rate control valve in the flow stop mode.

When the outside air temperature is equal to or less than the first preset value as the result of the first comparison step, the controller may operate the exhaust heat recovery device at the first control step.

The control step may include: comparing, by the controller at a second comparison step, the coolant temperature with a third preset value and comparing the oil temperature with a fourth preset value when the heater is off as the result of the heater identification step; and operating, based on a result of the second comparison step by the controller at a second control step, the flow rate control valve in the flow stop mode, or operating the exhaust heat recovery device.

When the coolant temperature is less than the third preset value as the result of the second comparison step, the controller may operate the flow rate control valve in the flow stop mode at the second control step, and when the coolant temperature exceeds a second preset value, the controller may operate the exhaust heat recovery device while stopping the operating of the flow rate control valve in the flow stop mode.

When the coolant temperature is equal to or greater than the third preset value and the oil temperature is less than the fourth preset value as the result of the second comparison step, the controller may operate the exhaust heat recovery device.

When the coolant temperature is equal to or greater than the third preset value and the oil temperature is equal to or greater than the fourth preset value as the result of the second comparison step, the controller stop operating the flow rate control valve and the exhaust heat recovery device.

According to the temperature management method for the hybrid vehicle having the above-described structure, it is possible to rapidly warm up the engine, whereby fuel efficiency of the vehicle can be enhanced.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, a temperature management method for a hybrid vehicle according to exemplary embodiments of the present disclosure will be described in detail with reference to the accompanying drawings.

Figure 1:
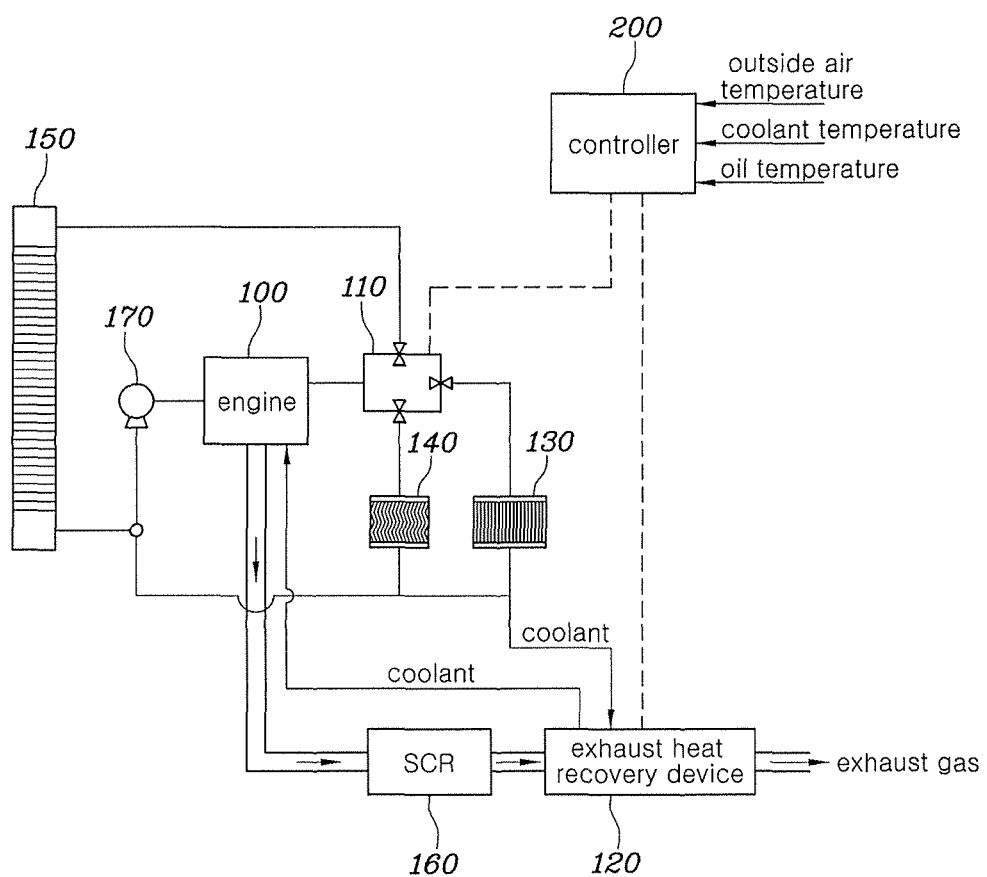
FIG. 1 is a view illustrating configuration of a hybrid vehicle according to an exemplary embodiment of the present disclosure.
Figure 2:
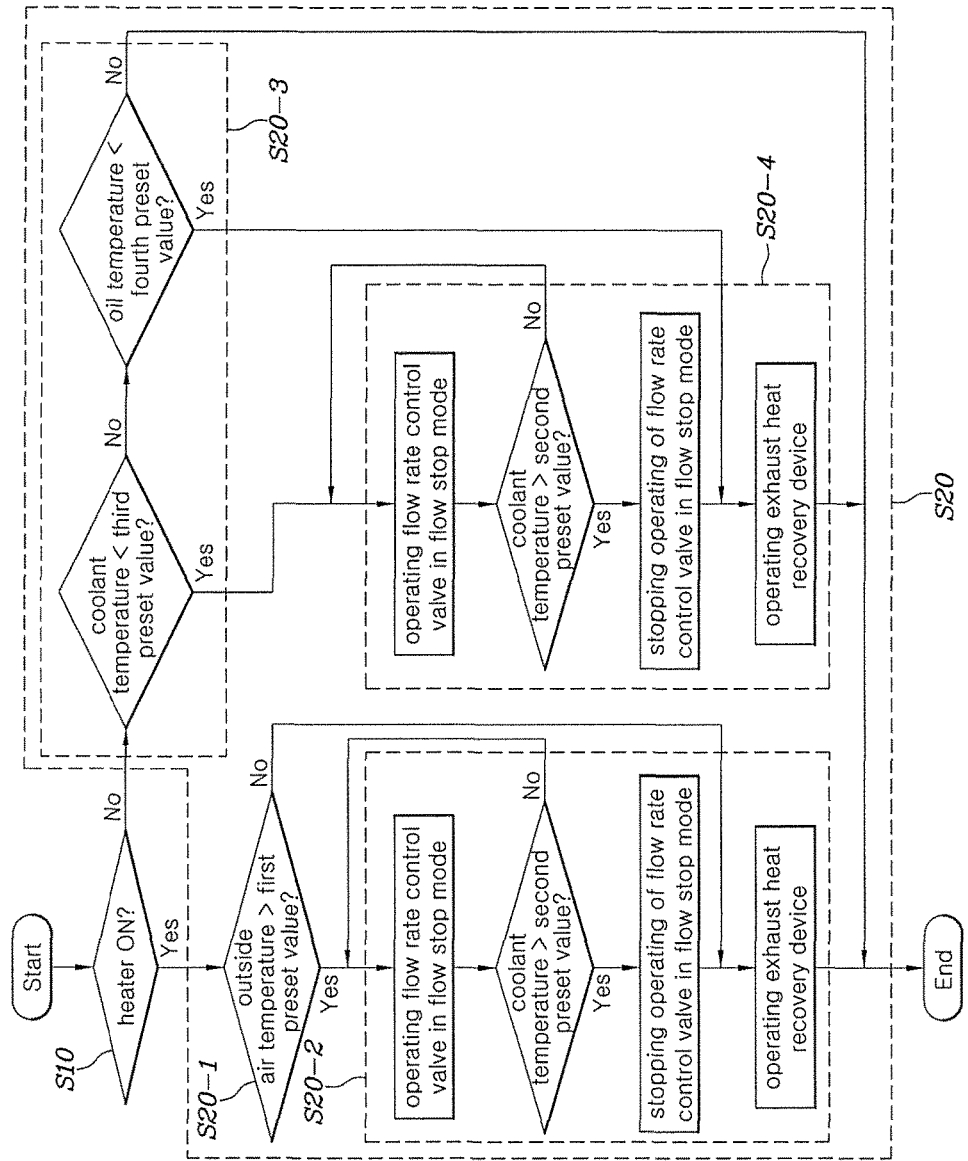
FIG. 2 is a flowchart illustrating a temperature management method for a hybrid vehicle according to an exemplary embodiment of the present disclosure.

FIG. 1 is a view illustrating configuration of a hybrid vehicle according to an exemplary embodiment of the present disclosure. FIG. 2 is a flowchart illustrating a temperature management method for a hybrid vehicle according to an exemplary embodiment of the present disclosure.

Referring to FIGS. 1 and 2, according to a temperature management method for a hybrid vehicle, the hybrid vehicle includes: a flow rate control valve 110 controlling flow of coolant to an engine 100, a heater 130, a heat exchanger 140, and a radiator 150; and an exhaust heat recovery device 120 coupled to the flow rate control valve 110 via the heater 130, the exhaust heat recovery device 120 performing heat exchange between the coolant received from the heater 130 and exhaust gas received from the engine 100, and supplying the heat-exchanged coolant to the engine 100. The temperature management method for the hybrid vehicle may include: identifying, by a controller 200 at a heater identification step S10, whether the heater 130 is on or off; and identifying, by the controller 200 at a control step S20, at least one of an outside air temperature, a coolant temperature, or an oil temperature depending on a result of the heater identification step S10, and operating the flow rate control valve 110 in a flow stop mode to prevent the coolant of the engine 100 from discharging, or operating the exhaust heat recovery device 120 based on data of identified temperature.

The various embodiments disclosed herein, the controller 200 may include the exhaust heat recovery device 120 integrated therein or one controller 200 may perform the functions of the exhaust heat recovery device 120 described herein.

That is, the flow rate control valve 110 distributes coolant received from the engine 100 to the engine 100, the heater 130, the heat exchanger 140, and the radiator 150. Particularly, when the flow rate control valve 110 is operated in the flow stop mode where all paths through which coolant of the engine 100 is distributed to the heater 130, to the heat exchanger 140, and to the radiator 150 are blocked, the temperature of the coolant remaining in the engine 100 increases, whereby warm-up rate of the engine 100 can be increased in starting the engine in a cold condition.

Exhaust gas discharged from the engine 100 passes through the exhaust heat recovery device 120 via a selective catalytic reduction (SCR) 160. The coolant discharged from the engine 100 is supplied to exhaust heat recovery device 120 via the heater 130. The exhaust heat recovery device 120 performs heat exchange between the exhaust gas and the coolant to heat the coolant, and supplies the heated coolant to the engine 100, whereby warm-up rate of engine 100 can be increased.

Particularly, the controller 200 of the present disclosure uses both the flow rate control valve 110 and the exhaust heat recovery device 120. However, in starting the engine 100, when operating the exhaust heat recovery device 120 while operating the flow rate control valve 110 in the flow stop mode, the exhaust heat recovery device 120 is operated without coolant such that there is a high probability of damage.

Therefore, the controller 200 controls the flow rate control valve 110 and the exhaust heat recovery device 120 to be alternately operated, whereby it is possible to rapidly warm up the engine 100 without mechanical damage.

Particularly, depending on whether the heater 130 is on or off, the controller 200 of the present disclosure may select one of: operating the flow rate control valve 110 in the flow stop mode; and operating the exhaust heat recovery device 120. A specific example thereof will be disclosed later.

Although not described, as shown in FIG. 1, the coolant that passed through the radiator 150 may be supplied to a water pump 170 or to the exhaust heat recovery device 120.

According to the temperature management method for the hybrid vehicle of the present disclosure, the control step S20 may include: comparing, by the controller 200 at a first comparison step S20-1, the outside air temperature with a first preset value when the heater 130 is on as the result of the heater identification step S10; and operating, based on a result of the first comparison step S20-1 by the controller 200 at a first control step S20-2, the flow rate control valve 110 in the flow stop mode, or operating the exhaust heat recovery device 120.

That is, when the heater 130 is turned on by a passenger, the controller 200 determines that a demand from the passenger for the performance of heating is the top priority, and identifies the outside air temperature to determine whether or not heating according to the passenger demand is necessary.

It is desired that the first preset value is set to a temperature that can be used for determining whether or not the outside air temperature is sufficient for the passenger to demand the performance of heating. The first preset value is a value that may differ depending on designers, vehicles, or regions such that the first preset value should not be limited to a specific value.

Accordingly, the controller 200 identifies the outside air temperature to determine whether the performance of heating on the passenger demand is necessary, and operates the flow rate control valve 110 in the flow stop mode or operates exhaust heat recovery device 120, whereby it is possible to increase the warm up rate of the engine.

Here, the controller 200 may sense outside air temperature data by using an outside air temperature sensor (not shown).

Specifically, when the outside air temperature exceeds the first preset value as the result of the first comparison step S20-1, the controller 200 may operate the flow rate control valve 110 in the flow stop mode at the first control step S20-2, and then, when the coolant temperature exceeds a second preset value, the controller 200 may operate the exhaust heat recovery device 120 while stopping the operating of the flow rate control valve 110 in the flow stop mode.

That is, when the outside air temperature exceeds the first preset value, the controller 200 determines that the performance of heating on the passenger demand can be realized only with the outside air temperature, and thus does not operate the heater 130.

Next, the flow rate control valve 110 is operated in the flow stop mode, and thus the coolant temperature in the engine 100 is increased, whereby the heating rate of the engine 100 can be increased in a cold condition. Here, when the coolant temperature exceeds the second preset value, the controller 200 stops the operating of the flow rate control valve 110 of the engine 100 in the flow stop mode and operates the exhaust heat recovery device 120, whereby damage to the exhaust heat recovery device 120 caused by flow stop can be prevented. Next, when the coolant temperature exceeds a predetermined temperature, the coolant bypasses the exhaust heat recovery device 120 and thus the exhaust heat recovery device 120 is not operated mechanically.

When the outside air temperature is equal to or less than the first preset value as the result of the first comparison step S20-1, the controller may operate the exhaust heat recovery device 120 at the first control step S20-2.

That is, when the outside air temperature is equal to or less than the first preset value, the controller 200 determines that a demand from the passenger for the performance of heating is the top priority, and operates the exhaust heat recovery device 120 and the heater 130. Through this, it is possible to heat the coolant being supplied to the engine 100 by the exhaust heat recovery device 120, whereby warm-up performance of the engine 100 can be enhanced.

In the meantime, the control step S20 may include: comparing, by the controller 200 at a second comparison step S20-3, the coolant temperature with a third preset value and comparing the oil temperature with a fourth preset value when the heater 130 is off as the result of the heater identification step S10; and operating, based on a result of the second comparison step S20-3 by the controller 200 at a second control step S20-4, the flow rate control valve 110 in the flow stop mode, or operating the exhaust heat recovery device 120.

When the heater 130 is off, it may be determined that there is no demand from the passenger for the performance of heating. However, when warming up the engine 100, operating the exhaust heat recovery device 120 is more effective than operating the flow rate control valve 110. Thus, the controller 200 senses a situation where the exhaust heat recovery device 120 should be used.

Here, based on the coolant temperature and the oil temperature of the engine 100, the controller 200 determines whether to operate the flow rate control valve 110 in the flow stop mode or operate the exhaust heat recovery device 120. Here, the controller 200 may sense the coolant temperature and the oil temperature by using a temperature sensor provided at the engine 100.

Specifically, when the coolant temperature is less than the third preset value as the result of the second comparison step S20-3, the controller 200 may operate the flow rate control valve 110 in the flow stop mode at the second control step S20-4, and then, when the coolant temperature exceeds a second preset value, the controller 200 may operate the exhaust heat recovery device 120 while stopping the operating of the flow rate control valve 110 in the flow stop mode.

That is, when the coolant temperature in the engine 100 is less than the third preset value, the controller 200 operates the flow rate control valve 110 in the flow stop mode first because it is required to increase the coolant temperature regardless of the oil temperature.

For example, when the coolant temperature is less than the third preset value and the oil temperature in the engine is low, the engine 100 is completely soaked and thus the flow rate control valve 110 is operated in the flow stop mode so as to rapidly warm up the engine.

In contrast, when the coolant temperature is less than the third preset value and the engine oil temperature in the engine is relatively high, the engine 100 has been warmed up, but the engine has been turned on after the engine 100 was being cooled by traveling wind while being turned off during EV driving. Therefore, the flow rate control valve 110 is operated in the flow stop mode so as to increase the coolant temperature.

As described above, after operating the flow rate control valve 110 in the flow stop mode, when the coolant temperature exceeds the second preset value, the controller 200 determines that the coolant temperature is increased to an appropriate temperature. Thus, the controller stops the operating of the flow rate control valve 110 in the flow stop mode and operates the exhaust heat recovery device 120 by enabling the coolant to flow to the heater 130, whereby the engine 100 is continuously maintained in a warm-up condition.

Also, when the coolant temperature is equal to or greater than the third preset value and the oil temperature is less than the fourth preset value as the result of the second comparison step S20-3, the controller 200 may operate the exhaust heat recovery device 120.

That is, when the coolant temperature is at an appropriate level that is equal to or greater than the third preset value and the oil temperature in the engine 100 is less than the fourth preset value, the controller determines that the engine 100 is being warmed up and the oil temperature in the engine is not warmed up yet. Thus, the controller operates the exhaust heat recovery device 120 to rapidly increase the oil temperature in the engine.

In addition, when the coolant temperature is equal to or greater than the third preset value and the oil temperature is equal to or greater than the fourth preset value as the result of the second comparison step S20-3, the controller 200 may operate neither the flow rate control valve 110 nor the exhaust heat recovery device 120.

That is, when the coolant temperature and the oil temperature are respectively is equal to or greater than the third preset value and the fourth preset value, the controller determines that both the coolant temperature and the oil temperature are at appropriate levels. Thus, the controller 200 does not operate the exhaust heat recovery device 120, and does not operate the flow rate control valve 110 in the flow stop mode.

In the present disclosure, the controller 200 may include an electronic control unit (ECU); however, it is not limited therein.

According to the temperature management method for a hybrid vehicle having the above-described structure, it is possible to rapidly warm up the engine, whereby fuel efficiency of the vehicle can be enhanced.

Although an exemplary embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A temperature management method for a hybrid vehicle, wherein the vehicle includes:
   a flow rate control valve controlling flow of coolant to an engine, a heater, a heat exchanger, and a radiator; and
   an exhaust heat recovery device coupled to the flow rate control valve via the heater, the exhaust heat recovery device performing heat exchange between the coolant received from the heater and exhaust gas received from the engine, and supplying the heat-exchanged coolant to the engine, the method comprising:

identifying, by a controller, at a heater identification step, whether the heater is on or off; and identifying, by the controller, at a control step, at least one of an outside air temperature, a coolant temperature, or an oil temperature depending on a result of the heater identification step, and operating the flow rate control valve in a flow stop mode to prevent the coolant of the engine from discharging.

2. The method of claim 1, wherein the control step includes:

comparing, by the controller, at a first comparison step, the outside air temperature with a first preset value when the heater is on as the result of the heater identification step; and operating, by the controller, at a first control step, the flow rate control valve in the flow stop mode or operating the exhaust heat recovery device based on a result of the first comparison step.

3. The method of claim 2, wherein when the outside air temperature exceeds the first preset value as the result of the first comparison step, the controller operates the flow rate control valve in the flow stop mode at the first control step, and when the coolant temperature exceeds a second preset value, the controller operates the exhaust heat recovery device while stopping the operating of the flow rate control valve in the flow stop mode.

4. The method of claim 2, wherein when the outside air temperature is equal to or less than the first preset value as the result of the first comparison step, the controller operates the exhaust heat recovery device at the first control step.

5. The method of claim 1, wherein the control step includes:

comparing, by the controller, at a second comparison step, the coolant temperature with a third preset value and comparing the oil temperature with a fourth preset value when the heater is off as the result of the heater identification step; and operating, by the controller, at a second control step, the flow rate control valve in the flow stop mode or operating the exhaust heat recovery device based on a result of the second comparison step.

6. The method of claim 5, wherein when the coolant temperature is less than the third preset value as the result of the second comparison step, the controller operates the flow rate control valve in the flow stop mode at the second control step, and when the coolant temperature exceeds a second preset value, the controller operates the exhaust heat recovery device while stopping the operating of the flow rate control valve in the flow stop mode.

7. The method of claim 5, wherein when the coolant temperature is equal to or greater than the third preset value and the oil temperature is less than the fourth preset value as the result of the second comparison step, the controller operates the exhaust heat recovery device.

8. The method of claim 5, wherein when the coolant temperature is equal to or greater than the third preset value and the oil temperature is equal to or greater than the fourth preset value as the result of the second comparison step, the controller stops operating the flow rate control valve and the exhaust heat recovery device.

9. The method of claim 1, wherein in the control step, the controller operates the exhaust heat recovery device based on data of identified temperature.

* * * * *